W. J. SYMONS, R. J. BOYLE & W. A. BLAIND.
FILM FEEDING MECHANISM FOR KINETOSCOPES.
APPLICATION FILED MAY 22, 1912.
Reissued Nov. 10, 1914. 13,824.
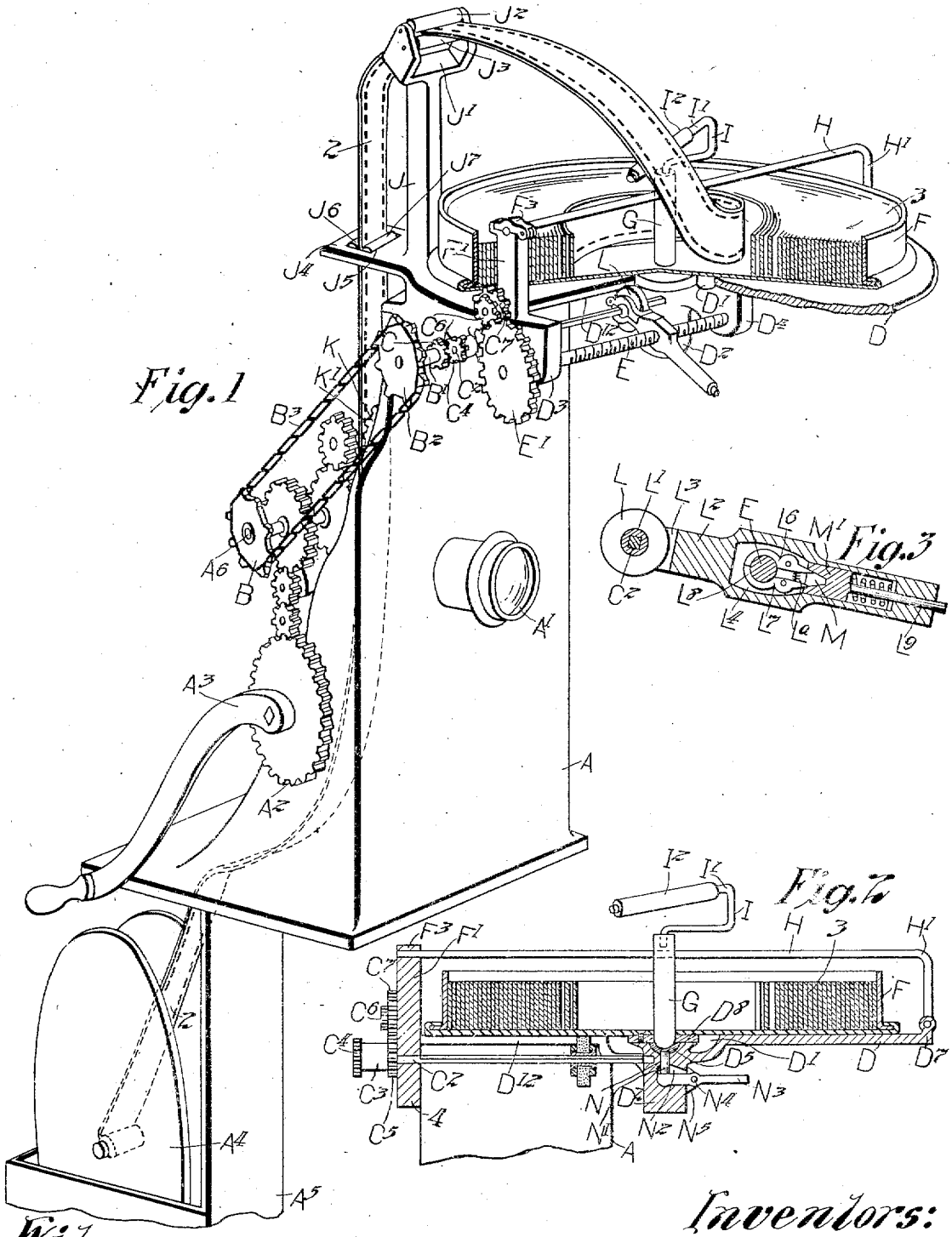
Witnesses:
S. B. Drusler
Henry Lanahan
Inventors:
W. J. SYMONS
R. J. BOYLE
W. A. BLAIND
By Pearce L. Piper
Their Atty.

UNITED STATES PATENT OFFICE.

WALTER J. SYMONS, ROBERT JOHN BOYLE, AND WILLIAM A. BLAIND, OF BELLEVILLE, ONTARIO, CANADA, ASSIGNORS OF SEVEN TWENTY-FOURTHS TO SAID SYMONS, ONE-EIGHTH TO SAID BOYLE, ONE-SIXTH TO SAID BLAIND, SEVEN TWENTY-FOURTHS TO HARRY OGILVIE STEWART, AND ONE-EIGHTH TO S. R. BURROWS, ALL OF BELLEVILLE, CANADA.

FILM-FEEDING MECHANISM FOR KINETOSCOPES.

Specification of Reissued Letters Patent. Reissued Nov. 10, 1914.

13,824.

Original No. 987,506, dated March 21, 1911, Serial No. 568,546. Application for reissue filed May 22, 1912. Serial No. 699,087.

*To all whom it may concern:*

Be it known that we, WALTER JAMES SYMONS, ROBERT JOHN BOYLE, and WILLIAM ALFRED BLAIND, subjects of the King of Great Britain, and residents of the city of Belleville, in the county of Hastings, in the Province of Ontario, Canada, have invented certain new and useful Improvements in Film-Feeding Mechanism for Kinetoscopes, of which the following is the specification.

Our invention relates to improvements in film-feeding mechanism for kinetoscopes and the object of the invention is to devise a feeding mechanism which will entirely dispense with rewinding the film on the reel and thus do away with the rewinder now commonly in use in this class of machines and thereby effect an economy in time and labor.

A further object is so to construct the mechanism as not to deleteriously affect the film as is the case where the film has to be pulled off the reel or rewound.

A further object is to obviate the tremor in the picture presented caused by the unevenness or vibration of feed in the mechanism as now constructed.

The invention consists essentially in the construction and the arrangements of parts as described in the following specification.

Figure 1 is a general perspective view of a portion of a kinetoscope showing our device connected thereto. Fig. 2 is a cross sectional view through the film feeding mechanism located at the top of the kinetoscope. Fig. 3 is an enlarged sectional view through the clutch connecting the driving wheel of the feed pan to the feed screw.

In the drawings like letters of reference indicate corresponding parts in each figure.

A is the main casting of the kinetoscope provided with the usual lens A′ and driving gears $A^2$ and operating crank $A^3$.

$A^4$ is the film receiving reel on to which the film 2 is wound from the center outwardly. The receiving reel is supported on a suitable casing $A^5$ and is suitably driven by means not illustrated so as to wind the film thereon.

$A^6$ is a supplemental shaft of the ordinary feeding mechanism (not shown) designed to feed the films past lens A′.

B is a sprocket wheel mounted on the shaft $A^6$.

B′ is a stud shaft journaled in a suitable portion of the main casting A of the kinetoscope.

$B^2$ is a sprocket wheel mounted on the stud shaft and $B^3$ is a sprocket chain connecting the gears B and $B^2$ together. C is a gear pinion also mounted on the stud shaft B′.

$C^2$ is a shaft journaled at one end in the bracket $C^3$ and at the opposite end in the central bearing $D^2$. The shaft $C^2$ is squared between the bearings 4 and $D^2$.

$C^4$ is a gear pinion mounted on one end of the stud shaft $C^2$ and meshing with the gear pinion C. $C^5$ is a gear pinion also mounted on the stud shaft $C^2$.

D is a circular table having a central orifice D′ and a vertical bearing $D^2$ supported beneath the table centrally of the orifice D′. The table D is provided with a radial slot $D^{12}$ for a purpose which will hereinafter be explained.

E is a feed screw journaled at each end in bearing lugs $D^3$ and $D^4$.

E′ is a gear wheel mounted on the outer end of the feed screw E and connected to the gear pinion $C^5$ by the intermediate gears $C^6$ and $C^7$.

F is a circular feed pan in which is horizontally located the film coil 3.

G is a central post which passes loosely through the feed pan F in proximity to the bottom thereof. The post G projects through the bottom feed pan and is provided with a hemispherical end designed to fit into the bearing cup $D^5$ fitting in the bearing $D^2$ of the table. An annular flange $D^8$ surrounds the post G, is secured to or forms a part of the feed pan, and rests normally on the bearing cup $D^5$ and the bearing $D^2$.

F′ is a standard extending upwardly from and forming part of the table D.

H is a cross rod extending intermediately of its length through the post G in which it is suitably secured. At one end of the cross rod H is provided a depending end H′, the lower extremity of which is hinged to the lug $D^7$ forming part of the table D. The opposite end of the cross rod H rests in the bearing standard F′, being held therein by a suitable hinged cap $F^3$. It will be seen that by this construction when a new film is being placed in the feed pan the cross rod H may be released from the standard F′ and thrown upwardly on its hinged end $D^7$ out of the way of the feed pan, said cross rod of course carrying the post G with it.

I is a bracket extending upwardly from the post G. The bracket I is provided with an arm I′ extending across over the center of the post at an angle to the cross rod H. The arm I′ is provided with a suitable bearing roller $I^2$.

J is a standard extending upwardly from the main casting A. The standard J is provided with a forked upper end J′ between the members of which are journaled the rollers $J^2$ and $J^3$.

$J^4$ is a horizontal arm extending rearwardly from the upper portion of table D of the main casting A.

$J^5$ is a slot formed in the frame $J^4$.

$J^6$ and $J^7$ are rollers journaled in the slot $J^5$.

K is the ordinary feed roll of the kinetoscope which is driven in the usual manner and is provided with the usual teeth K′ located at each end of the roller and designed to mesh with the slotted perforations formed at each edge of the kinetoscope strip 2 forming the coil 3.

It will be noticed on reference to the drawings that the strip 2 is unwound from the coil 3 from the center outwardly and as it is unwound it passes upwardly over the roller $I^2$ and between the rollers $J^2$ and $J^3$ and downwardly between the rollers $J^6$ and $J^7$ past the feed roller K, and from thence downwardly to the rewinding wheel $A^4$ on which it is wound from the center outwardly.

L is a driving wheel secured to the sleeve L′ slidably held upon the squared portion of the shaft $C^2$.

$L^2$ is an arm provided with a forked end $L^3$ which extends around the sleeve L′ to each side of the wheel L. The periphery of the drive roller L extends through the radial slot $D^{12}$ formed in the table D into contact with the bottom of the feed pan F.

$L^4$ is an orifice formed in the arm $L^2$ through which the feed screw E passes. The center portion of the interior of the arm $L^2$ is chambered out.

$L^6$ and $L^7$ are pivoted clutch arms provided with internally threaded portions $L^8$ engaging with the feed screw E. The opposite ends of the arms $L^6$ and $L^7$ are formed wedge-shape and fit into a correspondingly inclined recess M formed at the inner enlarged end of the spring plunger M′. The arms are forced apart by spring $L^5$. The reduced portion of the spring plunger M′ extends through an orifice $L^9$ so as to project past the end of the arm and form a spring pressure button whereby the spring plunger may be manually forced inwardly so as to spread the threaded clutch ends of the arms $L^6$ and $L^7$ and free them from the feed screw E.

N is a central bore formed in the bearings $D^2$ and in which is slidably held the pin N′. The upper end of the pin N′ fits into a slight recess in the bottom of the bearing cup $D^6$.

$N^2$ is an orifice extending through the bearing $D^2$ into the bore N.

$N^3$ is a lever pivotally supported by a pin $N^4$ on the lug $N^5$. The inner end of the lever $N^3$ extends through the opening $N^2$ and beneath the pin N′ for a purpose which will hereinafter be explained.

Having described the principal parts involved in our invention, we will briefly describe the operation of the same.

It will, of course, be understood that to operate the machine the crank handle $A^3$ is turned so as to feed or advance the film strip 2 downwardly past the lens A′. In our construction by the same operation the shaft $C^2$ is also rotated through the sprocket chain $B^3$ and intermediate gears C and $C^4$ thereby rotating the drive wheel L held in frictional contact with the bottom of the feed pan F, thereby rotating the same in the direction of the arrow so as to allow of the film strip 2 feeding freely from the center of the coil 3 over the roller $I^2$ and between the rollers $J^2$ and $J^3$ and the rollers $J^6$ and $J^7$ past the lens A′ to the rewinding reel $A^4$ on which it is wound from the center outwardly. It will be understood that by winding the film in this way it will be so arranged on the winding roller as to be ready for use when wound into a coil thereon. The feed screw E is driven from the gear $C^3$ so that the strip 2 is fed from the coil 3 at a uniform rate of speed. This, it will be readily seen, is attained by means of the feed screw E carrying the arm $L^2$ longitudinally along the shaft $C^2$, thereby also moving the drive roller L in the same direction so that the feed pan is rotated at all times at the speed required to feed the strip 2 from the coil 3 uniformly, as has been before stated. When the film strip has been fed in this manner onto the rewinding reel $A^4$, the coil so formed is ready for use. The reel is a separable reel of ordinary construction, as is commonly used in connection with kinetoscopes, and the outer flange of the reel is removable from the hub so as to allow of the coil being removed therefrom. When removed from the reel it is then placed in the feed pan F and passed through the machine in the same manner as the coil 3. When the whole coil 3 of the film strip 2 has been fed from the feed pan F, the threaded portion of the arm $L^2$ passes off the thread of the screw. When the new coil has been placed in the feed pan, it is necessary to pass the arm $L^2$ over the feed screw free of the thread thereof to the initial point of operation. This is accomplished by pressing the spring plunger M′ inwardly, thereby forcing the wedge-shape ends of the pivoted jaws together, spreading apart the opposite ends of the jaws, and freeing them from the feed screw. The arm may then be moved over the feed as above described. It is also necessary during this operation to raise the feed pan free of the driving wheel L. This is accomplished by first releasing the hinged cap $F^3$ so as to free the cross rod H. The outer end of the lever $N^3$ is then depressed so as to force the pin N vertically upwardly, thus raising the bearing cup $D^5$, the annular flange $D^8$ and the feed pan F.

From this description it will be seen that we have devised a very simple device whereby the rewinding of the film strip is dispensed with and by which the film strip will not be deleteriously affected by being pulled off the reel either primarily or in rewinding and also by which the film is firmly held when passing to the feed roller, so as to obviate any tremor in the picture presented caused by unevenness of vibration of the feed.

What we claim as our invention is:—

1. In apparatus of the class described, the combination with film-advancing mechanism, of means for supplying film thereto from the interior of a coil, including a rotatably mounted substantially horizontal feed pan for receiving the coil, said feed pan being provided with an engageable surface in fixed relation thereto, and mechanism operated by the film-advancing mechanism for rotating the pan at an angular speed which decreases with the unwinding of the film from the interior of the coil, including a driving wheel engaging said engageable surface to rotate the feed pan, said driving wheel being positively connected to said film-advancing mechanism, substantially as described.

2. Means for supplying film to a kinetoscope, including a rotatably mounted feed pan for receiving a coil of film, a driving wheel engaging said feed pan, a shaft for supporting and rotating said wheel, said wheel being movable longitudinally of said shaft, a rotatable screw-threaded shaft, power-transmitting means connecting said shafts, and connecting means between said wheel and said screw-threaded shaft in thread-engaging relation to the latter, substantially as described.

3. Means for supplying film to a kinetoscope, including a rotatably mounted feed pan for receiving a coil of film, a driving wheel engaging said feed pan, a shaft for supporting and rotating said wheel, said wheel being movable longitudinally of said shaft, a rotatable screw-threaded shaft, and connecting means between said wheel and said screw-threaded shaft capable of being disposed in either thread-engaging or non-thread-engaging relation to the latter as desired, substantially as described.

4. In apparatus of the class described, film-advancing mechanism, a rotatably mounted feed pan for receiving a coil of film, a driving wheel engaging said feed pan, a shaft for supporting and rotating said wheel, said wheel being movable longitudinally of said shaft, a rotatable screw-threaded shaft, connecting means between said wheel and said screw-threaded shaft in thread-engaging relation to the latter, and power-transmitting means connected with said film-advancing mechanism for rotating said shafts, substantially as described.

5. In apparatus of the class described, a supporting table provided with a radially disposed opening, a rotatable substantially horizontal feed pan supported centrally on said table and adapted to receive a coil of film, a driving shaft journaled beneath said opening and radially disposed with respect to said feed pan, a driving roller adapted to engage the bottom of said pan and supported upon said shaft and longitudinally movable thereon, said feed pan being held in engagement with said driving roller, and means whereby said feed pan may be moved out of engagement with said driving roller, substantially as described.

6. The combination of a kinetoscope, and means for supplying film thereto, including a rotatably mounted film coil support, a driving wheel for rotating said film coil support, a screw threaded shaft, a connection between said wheel and said shaft, means for rotating said shaft at a substantially uniform speed, and means for rotating said wheel at a substantially uniform speed, substantially as described.

7. In a device of the class described, a supporting table provided with a radial slot, a feed pan supported centrally on the table and designed to contain the film coil, a driving shaft journaled beneath the radial slot, a driving roller supported upon the shaft and engaging with the bottom of the feed pan, and means for moving the driving roller longitudinally along the driving shaft in unison with the unwinding of the film coil, as and for the purpose specified.

8. In a device of the class described, a supporting table provided with a radial slot, a feed pan rotatably supported upon the table, a driving shaft journaled beneath the radial slot, a feed screw also journaled on each end beneath the table, a driving wheel rotatably connected to the driving shaft and capable of longitudinal movement thereon and held in frictional engagement with the bottom of the feed pan, and means operated by the feed screw for moving the drive wheel longitudinally in unison with the unwinding of the film from the coil, as and for the purpose specified.

9. In a device of the class described, the combination with a main casting provided with a supporting table having a radial slot and a stationary center post extending upwardly, a feed pan having a center orifice through which the center post extends, a driving shaft journaled at each end beneath the radial slot and having a squared central portion, a driving wheel mounted on such portion so as to frictionally engage the bottom of the feed pan, a feed screw also journaled beneath the table, an arm threaded thereon having a forked end extending to each side of the aforesaid driving wheel, and means for throwing the arm in and out of engagement with the feed screw, as and for the purpose specified.

10. In a device of the class described, the combination with a feed pan and a supporting table having a radial slot and on which the feed pan is rotatably mounted, a square driving shaft journaled beneath the radial slot, a drive wheel mounted thereon, a feed screw also journaled beneath the table, an arm having a forked end extending to each side of the drive wheel and provided with internally threaded jaw members through which the feed screw extends, and means for spreading the jaw members apart to disengage the screw, as and for the purpose specified.

11. In a device of the class described, the combination with a squared driving shaft, a drive wheel mounted thereon, a feed screw having pivoted internally threaded jaw members engaging with the feed screw, a spring plunger designed to engage with the said jaw members to open them free of the feed screw, as and for the purpose specified.

12. In a device of the class described, the combination with a supporting table having a central recess, a post extending upwardly from such recess, a feed pan through which the stationary post loosely extends, a hinged cross bar extending through the post, a supplemental standard forming part of the supporting table, and means for releasably securing the free end of the cross bar therein, as and for the purpose specified.

13. In a device of the class described, the combination with a supporting table having a radial slot and a center recess, a center post supported within the recess, and a feed pan having a central hole through which the center post extends, of a squared driving shaft, a driving wheel mounted thereon and engaging the bottom of the feed pan, a feed screw, an arm having an internally threaded portion through which the feed screw extends, and a jaw end extending to each side of the drive wheel, means for releasing the arm out of engagement with the feed screw, and means for raising the post and feed pan out of engagement with the driving wheel, as and for the purpose specified.

14. In apparatus of the class described, the combination with film-advancing mechanism, of means for supplying film thereto including a rotatably mounted feed pan for receiving a coil of film, and means for rotating the pan at an angular speed which decreases with the unwinding of the film from the interior of the coil, including a driving wheel for rotating said pan and means positively connected with the film-advancing mechanism and operated thereby for moving said driving wheel outwardly with respect to the axis of said pan as the film is advanced, substantially as described.

This specification signed and witnessed this 13th day of May, 1912.

WALTER J. SYMONS.
ROBERT JOHN BOYLE.
WM. A. BLAIND.

Witnesses:
S. R. Sommer,
R. G. Bell.